United States Patent [19]
Arima et al.

[11] Patent Number: 5,224,352
[45] Date of Patent: Jul. 6, 1993

[54] CONTROL DEVICE FOR AN ABSORPTION REFRIGERATION MACHINE

[75] Inventors: Hidetoshi Arima; Masahiro Furukawa; Kazuyasu Iramina, all of Oizumi; Takeshi Okumura, Ota; Masashi Izumi, Ora; Tomoyuki Murayama, Tatebayashi, all of Japan

[73] Assignee: Sanyo Electric Co., Ltd., Osaka, Japan

[21] Appl. No.: 767,312

[22] Filed: Sep. 30, 1991

[30] Foreign Application Priority Data

Sep. 28, 1990 [JP] Japan .................................. 2-262519
Nov. 1, 1990 [JP] Japan .................................. 2-298514

[51] Int. Cl.[5] .............................................. F25B 15/00
[52] U.S. Cl. .......................................... 62/141; 62/476; 395/900
[58] Field of Search .................. 62/141, 476, 483, 157, 62/208, 209, 215, 142, 146, 147; 395/900, 61

[56] References Cited

U.S. PATENT DOCUMENTS

| | | | |
|---|---|---|---|
| 2,948,124 | 8/1960 | Embury | 62/141 |
| 3,550,391 | 12/1970 | Greacen | 62/141 |
| 3,837,174 | 9/1974 | Miyagi et al. | 62/141 |
| 4,472,947 | 9/1984 | Saito et al. | 62/141 |
| 4,914,924 | 4/1990 | Takahashi | 62/133 |

OTHER PUBLICATIONS

"Fuzzy PID Supervisor" H. R. van Nauta et al., 24th IEEE Conference on Decision and Control Dec. 11-13, 1985.
"A VLSI Fuzzy Logic Controller with Reconfigurable, Cascadable Architecture" H. Watanabe et al., IEEE Journal of Solid State Circuits vol. 25 No. 2 4-90.
"Neural Networks and Fuzzy Logic, Tools of Promise for Controls" Tom McCusker *Control Engineering* May 1990.

*Primary Examiner*—Albert J. Makay
*Assistant Examiner*—William C. Doerrler
*Attorney, Agent, or Firm*—Nikaido, Marmelstein, Murray & Oram

[57] ABSTRACT

A control device for an absorption refrigeration machine in which an evaporator, an absorber, an absorption liquid pump, a generator and a condenser, etc. are connected to form a refrigeration cycle. A heating amount of the generator is controlled on the basis of external conditions or internal conditions. The device includes a detection device for detecting a plurality of change amounts representative of the external conditions or internal conditions. A memory device stores fuzzy rules and membership functions between the change amounts and a rotational speed of the absorption liquid pump. An arithmetic unit carries out fuzzy logical calculations based on the change amounts and the fuzzy rules and membership functions to calculate the rotational speed of the absorption liquid pump. A control device inputs an output of the arithmetic unit to control the rotational speed of the absorption liquid pump.

5 Claims, 14 Drawing Sheets

FIG. 2
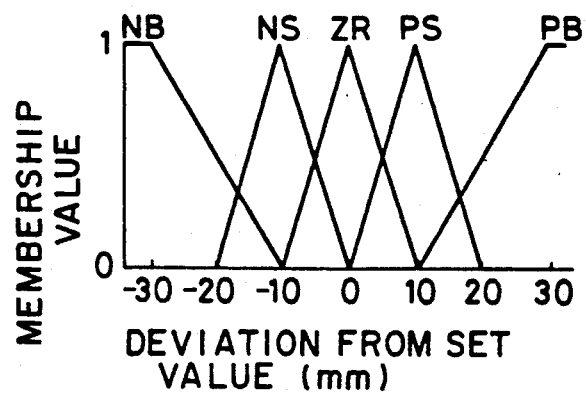
FIG. 3
| eTo | NB | NS | ZR | PS | PB |
|-----|----|----|----|----|-----|
| KQ  | PB | PS | ZR | NS | NB |
FIG. 4
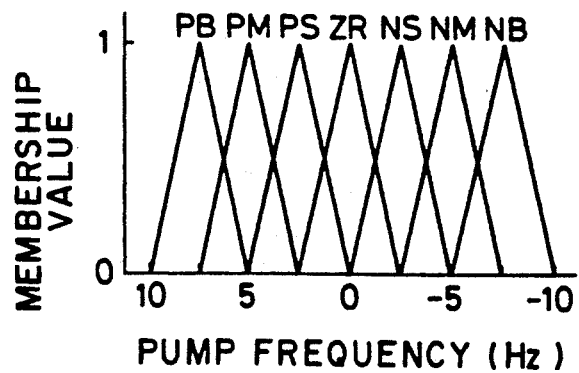

FIG. 5
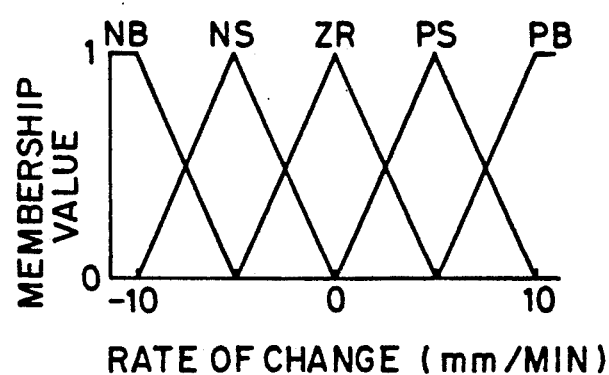
FIG. 6
FIG. 7
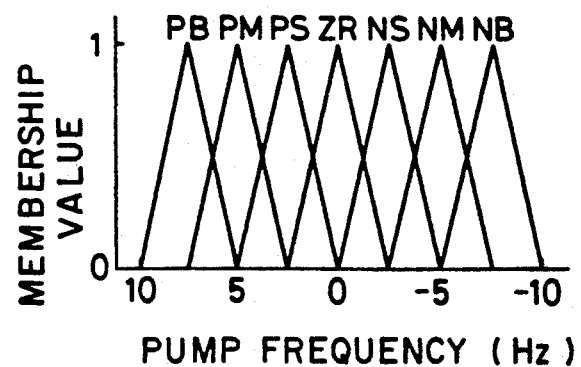

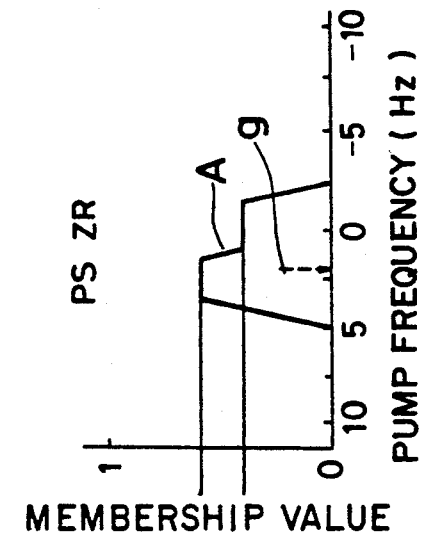
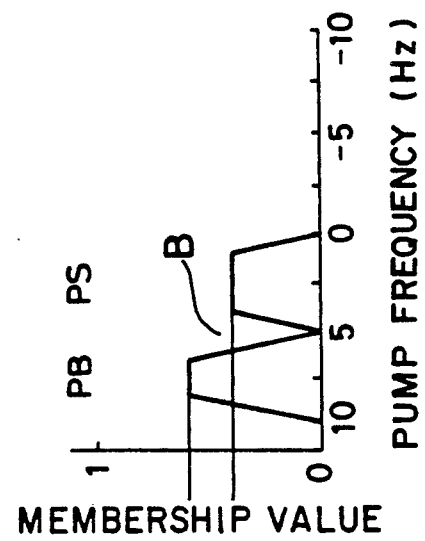
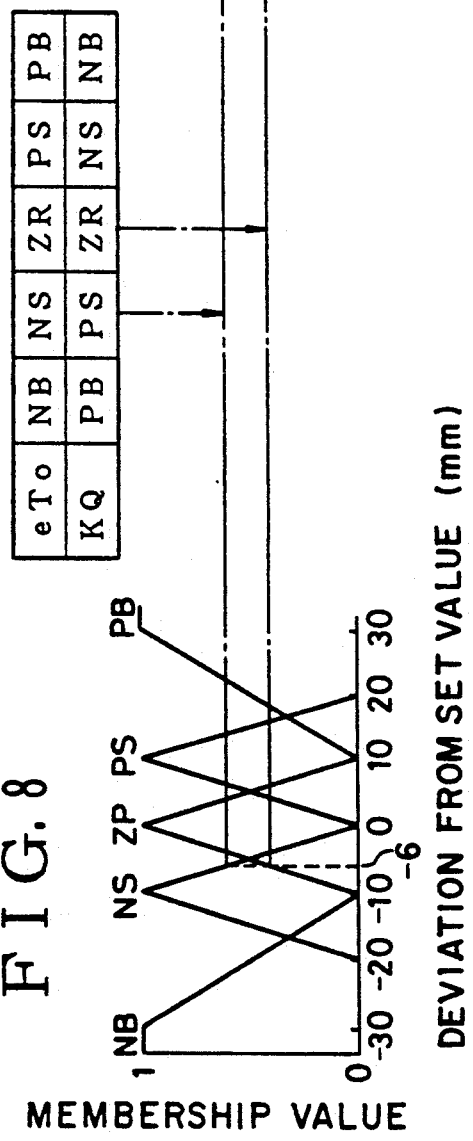
FIG. 8
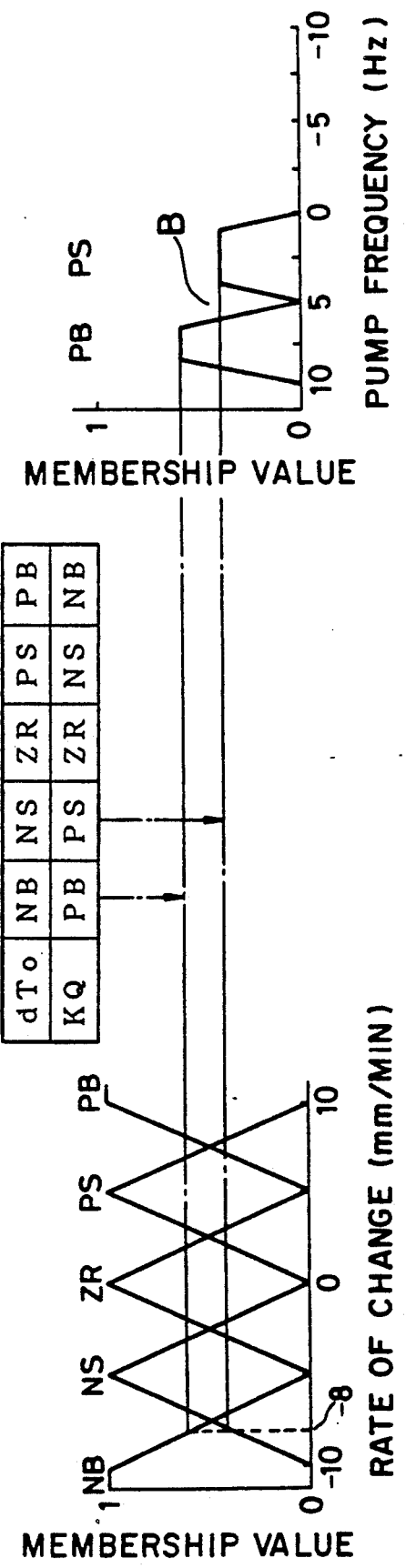
FIG. 9

| eLg | NB | NS | ZR | PS | PB |
|-----|----|----|----|----|----|
| dIn | PB | PS | ZR | NS | NB |

| dLg | NB | NS | ZR | PS | PB |
|-----|----|----|----|----|----|
| dIn | PB | PS | ZR | NS | NB |

| dBk | NB | NS | ZR | PS | PB |
|-----|----|----|----|----|----|
| dIn | NB | NS | ZR | PS | PB |

F I G. 15
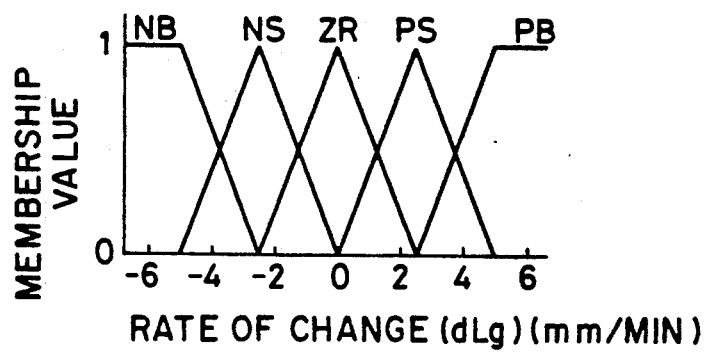
F I G. 16
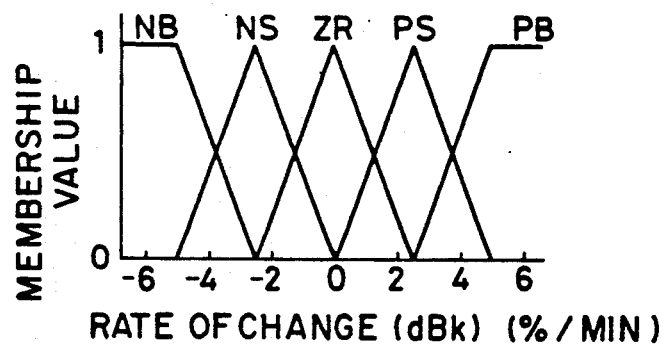
F I G. 17
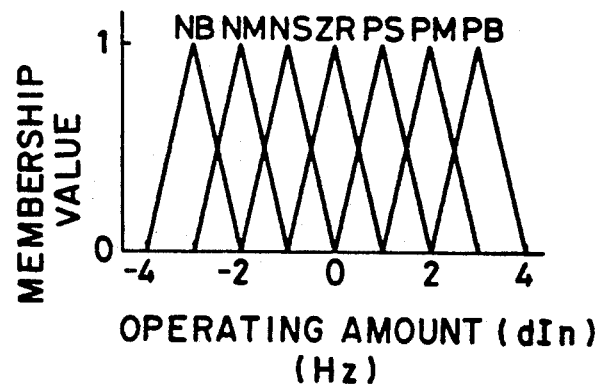

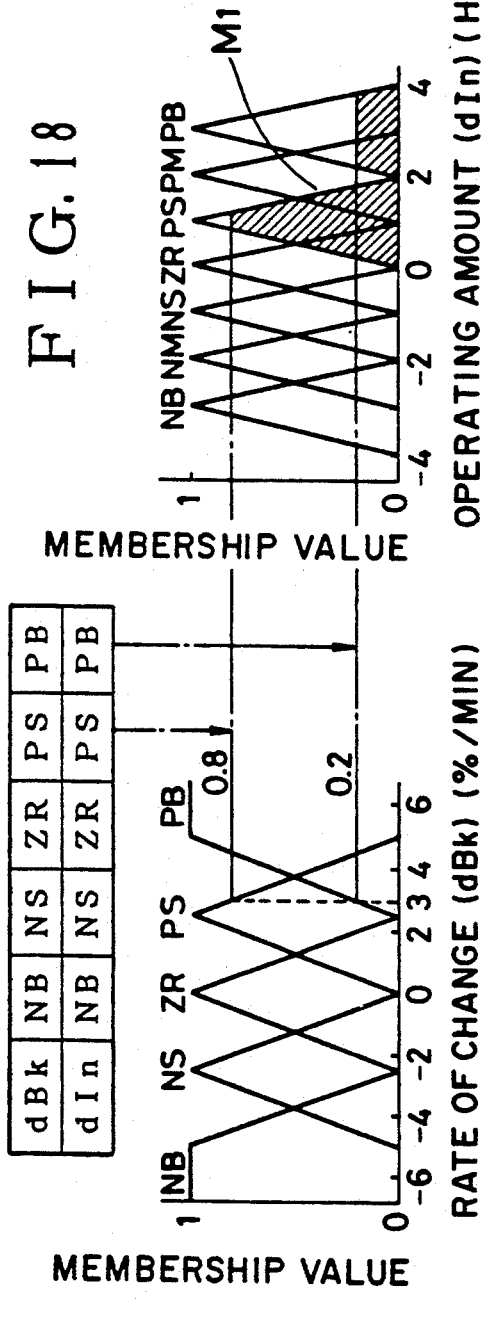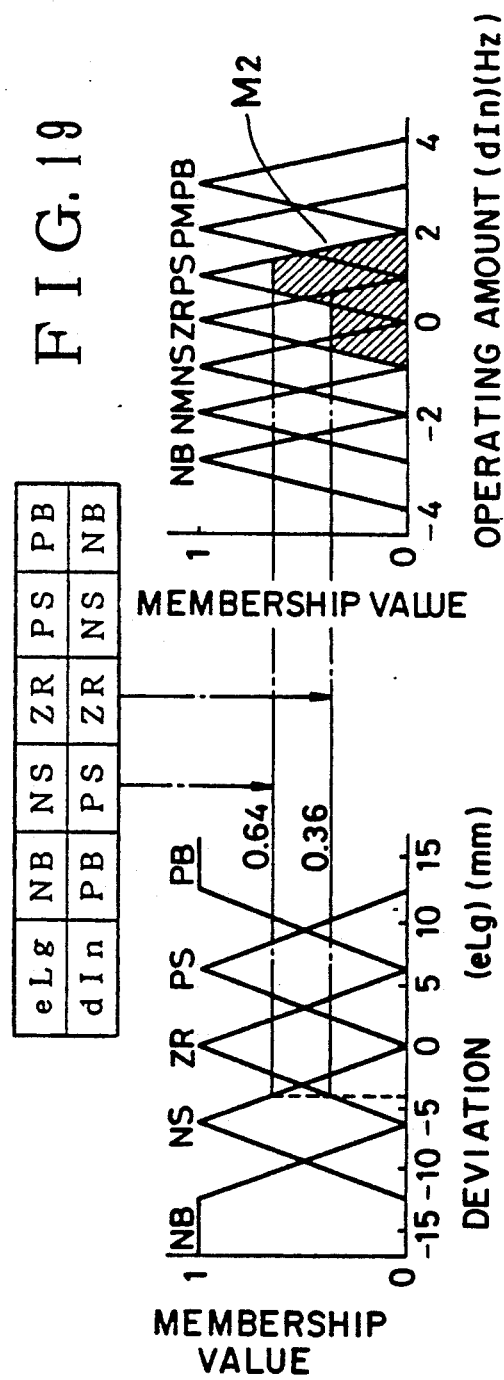

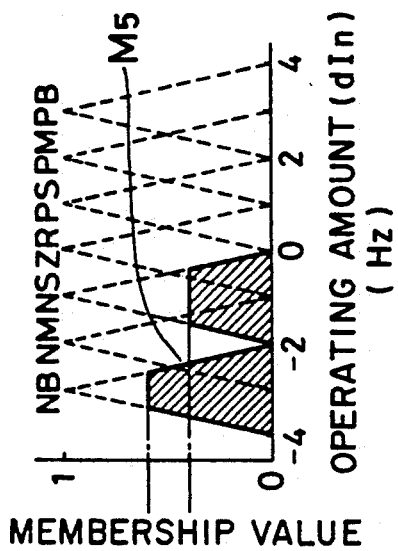
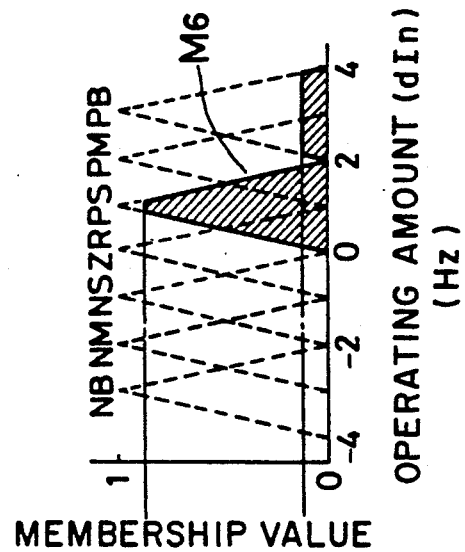
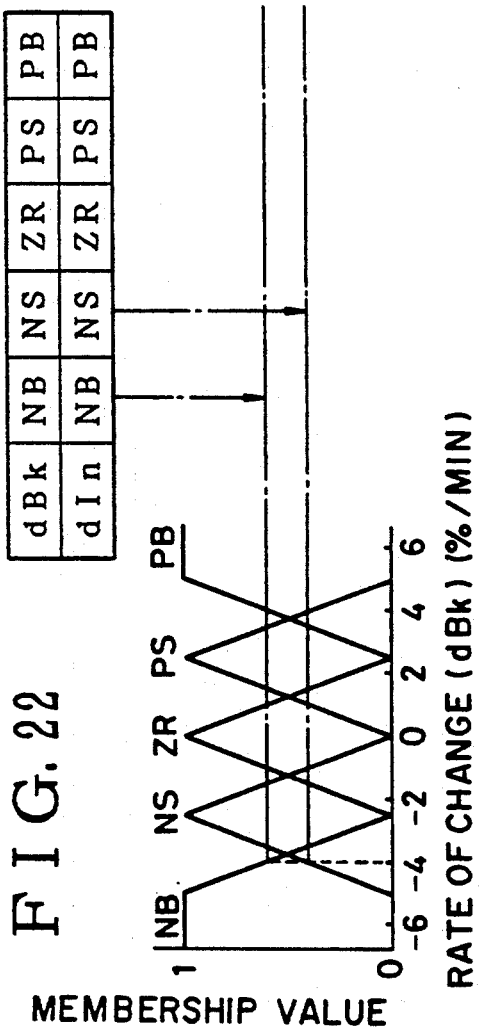
FIG. 22
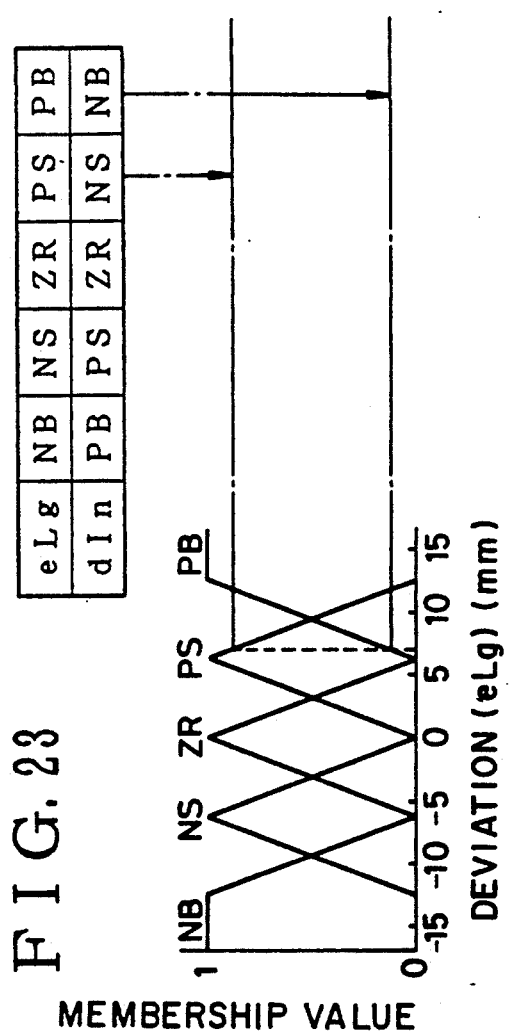
FIG. 23

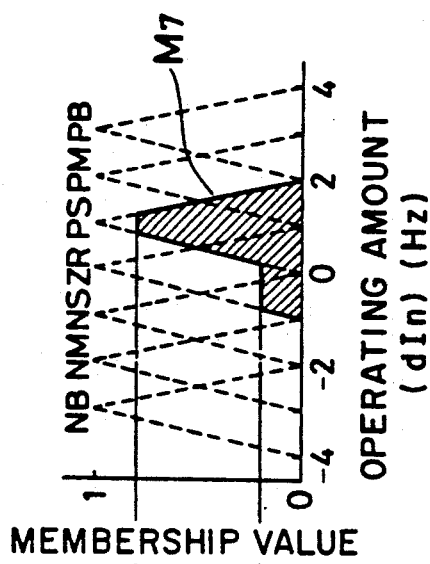
FIG. 24
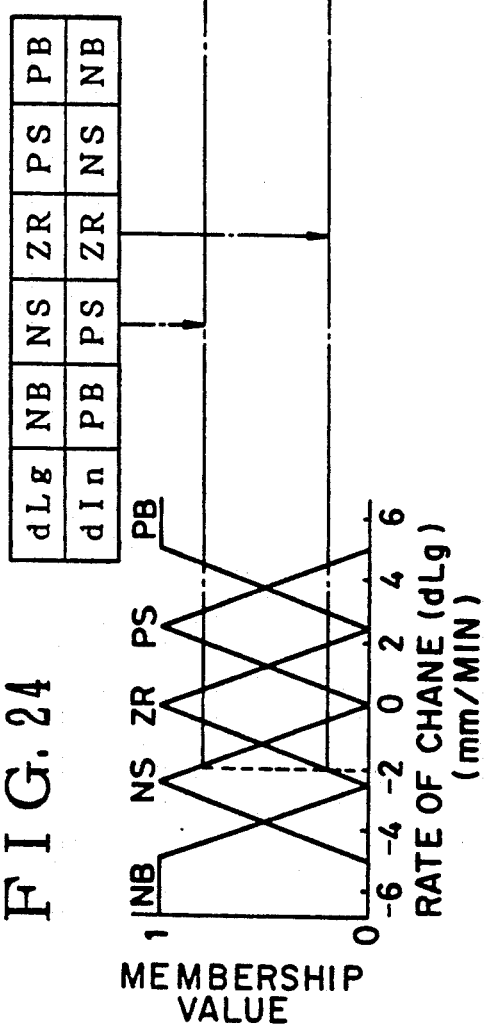
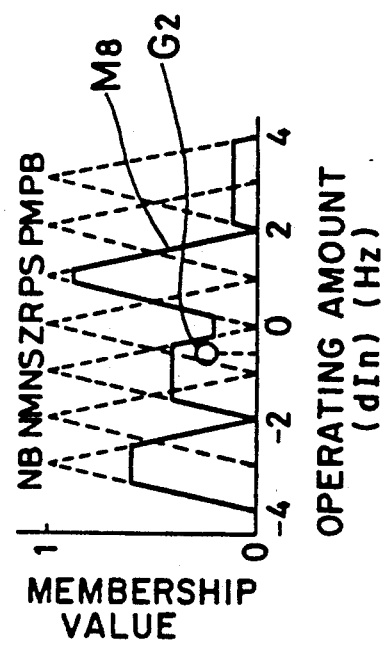
FIG. 25

FIG. 26
| dTci | NB | NS | ZR | PS | PB |
| --- | --- | --- | --- | --- | --- |
| dIn | NB | NS | ZR | PS | PB |
FIG. 27
| dTg | NB | NS | ZR | PS | PB |
| --- | --- | --- | --- | --- | --- |
| dIn | NB | NS | ZR | PS | PB |
FIG. 28
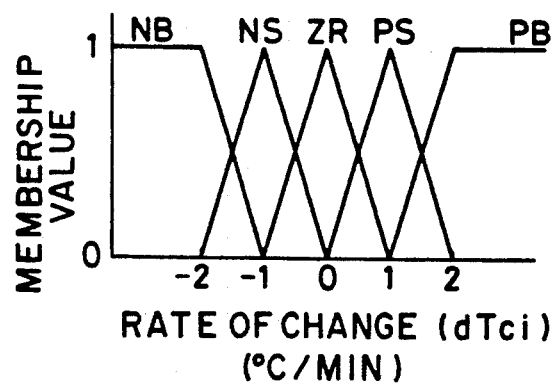
FIG. 29
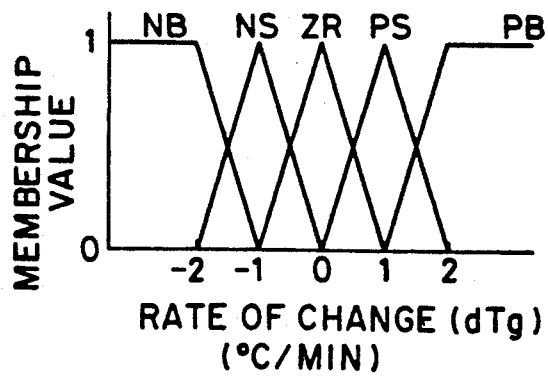

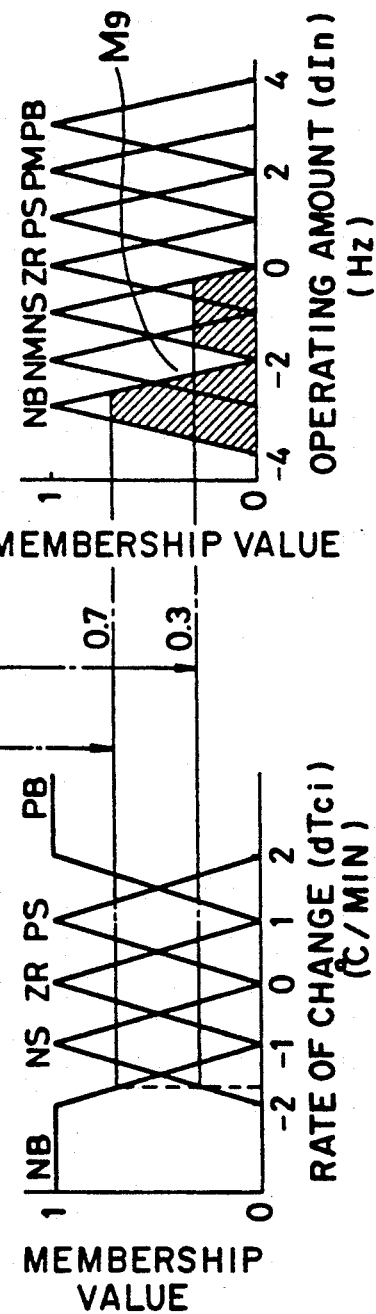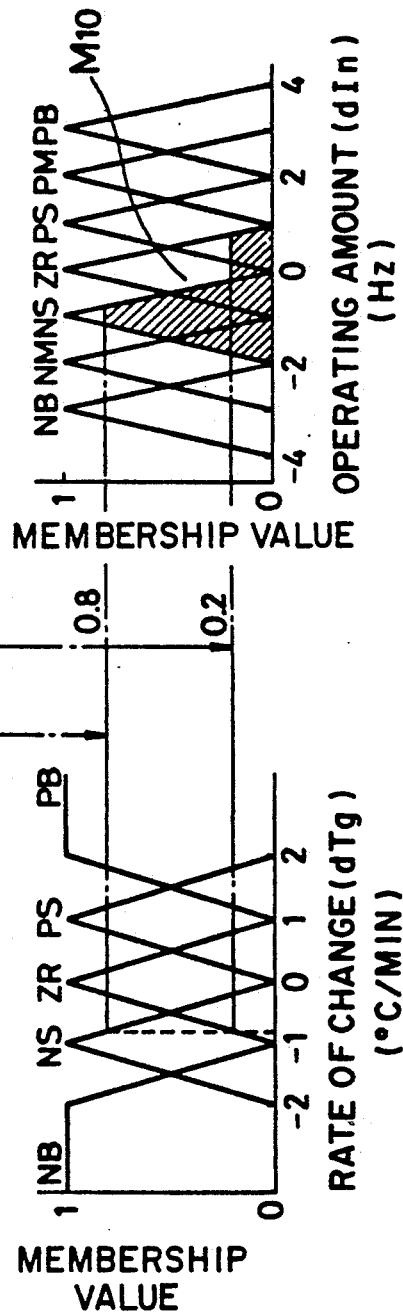
FIG. 30
FIG. 31

CONTROL DEVICE FOR AN ABSORPTION REFRIGERATION MACHINE

BACKGROUND OF THE INVENTION

1. Field of the Invention

The present invention relates to an absorption refrigeration machine, and more particularly to a control device for an absorption refrigeration machine.

2. Description of the Prior Art

For example, Japanese Patent Laid-Open No. 62-84267 publication discloses an absorption refrigeration machine provided with a control device which detects a liquid surface of a high temperature generator and which controls a discharge amount of an absorption liquid pump provided in a solution flowpassage from an absorber to a generator.

In the above-described conventional technique, the following properties of the control of the absorption liquid pump is poor at the time of an abrupt variation of load, variation of cooling water temperature, and start and stop of the absorption refrigeration machine. For example, the absorption liquid pump possibly stops at a high liquid surface of the high temperature generator, and the absorption refrigeration machine possibly abnormally stops at a low liquid surface.

Further, Japanese Patent Laid-Open No. 58-160778 publication discloses a control device for an absorption refrigeration machine which detects a cooling water outlet temperature to control a heating amount to a generator, detects an absorption liquid level within the generator to control an amount of a dilute absorption liquid which flows from an absorber to the generator, detects a cooling water inlet temperature to obtain an optimum value of either of a heating amount of the generator with respect to the inlet temperature or an amount of a dilute absorption liquid flowing to the generator, and controls either of the heating amount or the amount of the dilute absorption liquid according to an optimum value.

In the above-described conventional technique, proportional control which detects a level of absorption liquid within the generator to control an amount of dilute absorption liquid flowing from the absorber to the generator, or PID control has been generally carried out.

However, the aforementioned control has a problem in that the responsiveness to the start and stop, gentle load variation, abrupt load variation or variation in temperature of cooling water is poor.

SUMMARY OF THE INVENTION

It is therefore an object of the present invention to provide a control device for an absorption refrigeration machine having an excellent responsiveness which maintains constant a liquid surface of a generator with respect to start and stop or abrupt variation of load of the absorption refrigeration machine.

It is a further object of the present invention to provide a control device for an absorption refrigeration machine having an excellent responsiveness with respect to start and stop or variation of load.

For achieving the aforesaid objects, according to a first aspect of the present invention, there is provided a control device for an absorption refrigeration machine in which an evaporator 4, an absorber 5, a high temperature generator 1, a condenser 3, etc. are connected to form a refrigeration cycle, and a heating amount of the high temperature generator 1 is controlled and a circulating amount of absorption liquid is controlled. The device comprises a detection device for detecting a plurality of change amounts representative of external conditions and internal conditions such as an opening degree of a heating-amount control valve. A memory device 28 stores a fuzzy rule and a membership function. An arithmetic unit 27 calcultes a rotational speed of an absorption liquid pump 6 for feeding an absorption liquid from the absorber 5 to the high temperature generator 1 by fuzzy logical calculations. A control device inputs an output of the arithmetic unit 27 to increase or decrease the rotational speed of the absorption liquid pump. Thus, the circulating amount of the absorption liquid is controlled.

According to a second aspect of the present invention, there is provided a control device for an absorption refrigeration machine comprising a liquid surface detector 24 provided on a high temperature generator 1, and a microcomputer control panel 23 for comparing an absorption liquid surface detected by the liquid surface detector 24 with a set value and controlling a frequency of electric power supplied to an absorption liquid pump 6 by fuzzy logical calculations.

According to a third aspect of the present invention, there is provided a control device for an absorption refrigeration machine comprising a liquid surface detector 24 for detecting an absorption liquid surface of a high temperature generator 1, and a microcomputer control panel 23 for controlling a frequency of electric power supplied to an absorption liquid pump 6 by fuzzy logical calculations based on a deviation from a set value of the absorption liquid surface detected by the liquid surface detector 24, a rate of change of the absorption liquid surface, a membership function and a fuzzy rule to adjust the rotational speed of the absorption liquid pump 6.

According to a fourth aspect of the present invention, there is provided a control device for an absorption refrigeration machine comprising a memory device 28 for storing a level of an absorption liquid of a high temperature generator 1, a fuzzy rule between a heating amount of the high temperature generator 1 and a circulating amount of the absorption liquid, a level of the absorption liquid of the high temperature generator 1 and a membership function between a heated amount of the high temperature generator 1 and a circulating amount of the absorption liquid. A fuzzy inference processor carries out fuzzy logical calculations based on the liquid surface of the absorption liquid of the high temperature generator 1, the heating amount of the high temperature generator 1, the fuzzy rules and the membership functions to calculate an operating amount of an absorption liquid pump 6. A control device 26 inputs an output of the fuzzy inference processor 27 to increase or decrease a frequency of electric power supplied to the absorption liquid pump. The circulating amount of the absorption liquid is thus controlled.

According to a fifth aspect of the present invention, there is provided a control device for an absorption refrigeration machine comprising a fuzzy inference processor 27 for calculating an operating amount of an absorption liquid pump 6 by fuzzy logical calculations based on a liquid surface of an absorption liquid of a high temperature generator, a heating amount of the high temperature generator, a temperature of the high temperature generator 1, a fuzzy rule and a membership function. A control device 26 inputs an output of the fuzzy interference processor 27 to increase or decrease a frequency of electric power supplied to the absorption liquid pump. The circulating amount of the absorption liquid is thus controlled.

According to sixth aspect of the present invention, there is provided a control device for an absorption refrigeration machine comprising a fuzzy inference processor 27 for calculating an operating amount of an absorption liquid pump by fuzzy logical calculations based on a deviation from a set value of a liquid surface of an absorption liquid of a high temperature generator 1, a rate of change of the absorption liquid surface of the high temperature generator 1, a rate of change of a heating amount of the high temperature generator 1, a rate of change of a temperature of the high temperature generator 1, a rate of change of an inlet temperature of cooling water, a fuzzy rule and a membership function. A control device 26 inputs an output of the fuzzy inference processor 27 to increase or decrease a frequency of electric power supplied to an absorption liquid pump 6. The circulating amount of the absorption liquid is thus controlled.

In the case where an opening degree of a heating-amount control valve 17 of a high temperature generator 1 is changed due to a change of refrigeration load or the like, the rotational speed of an absorption liquid pump 6 for feeding an absorption liquid from an absorber 5 to the high temperature generator 1 is controlled by fuzzy inference calculation on the basis of human experiences so that a liquid level of the high temperature generator 1 is maintained substantially constant to render possible an increase of heating efficiency of the absorption liquid of the high temperature generator 1.

In the case where the absorption liquid surface of the high temperature generator 1 is changed, the absorption liquid surface is compared with the set value by the microcomputer control panel 23, and the fuzzy inference calculation is carried out by human experiences. When the absorption liquid surface is considerably changed, the frequency of electric power supplied to the absorption liquid pump 6 is also considerably changed to change the discharge amount of the absorption liquid of the absorption liquid pump 6, rendering possible to maintain substantially constant the absorption liquid surface of the high temperature generator 1.

Furthermore, the fuzzy logical calculation is carried out by the deviation from, for example, the set value of the absorption liquid surface, the rate of change, the membership function and the fuzzy rule. The frequency of electric power supplied to the absorption liquid pump 6, for example, is controlled by the result of the calculation, and the amount of the absorption liquid fed to the high temperature generator 1 can be adequately controlled on the basis of human experiences, thus capable of providing a control device which is quick in responsiveness with respect to the changes of refrigeration load or inlet temperature of cooling water to maintain an absorption liquid surface constant.

Moreover, the operating amount of the absorption liquid pump 6 is calculated by the fuzzy logical calculation in the fuzzy inference processor 27 on the basis of the absorption liquid surface of the high temperature generator 1, the heating amount of the high temperature generator 1, the temperature of the high temperature generator 1, the inlet temperature of cooling water, the fuzzy rule stored in the memory device 28 and the membership function, and when the absorption liquid surface of the high temperature generator 1 is changed or when the heating amount of the high temperature generator 1 is changed, etc., the frequency of electric power supplied to the absorption liquid pump 6 is changed on the basis of human experiences to render possible the control of the circulating amount of the absorption liquid which is excellent in responsiveness with respect to the start, stop, abrupt variation of refrigeration load or gentle variation.

BRIEF DESCRIPTION OF THE DRAWINGS

FIG. 2 is a view defining a membership function of a fuzzy variable to a deviation from a set value of an absorption liquid surface;

FIG. 3 is a view showing a control rule between a deviation and an operating amount;

FIG. 4 is a view defining a membership function of a fuzzy variable to a frequency of an absorption liquid pump;

FIG. 5 is a view defining a membership function of a fuzzy variable to a rate of change of an absorption liquid surface;

FIG. 6 is likewise a view showing a control rule between a rate of change and an operating amount;

FIG. 7 is a view defining a membership function of a fuzzy variable to a frequency of an absorption liquid pump;

FIG. 8 is an explanatory view of fuzzy logical calculation when a deviation is −6 mm;

FIG. 9 is an explanatory view of fuzzy logical calculation when a rate of change is −8 mm/min.;

FIG. 15 is a view defining a membership function of a fuzzy variable to a rate of change (dLg);

FIG. 16 is a view defining a membership function of a fuzzy variable to a rate of change (dBk);

FIG. 17 is a view defining a membership function of a fuzzy variable to an operating amount (frequency of an absorption liquid pump);

FIG. 18 is an explanatory view of fuzzy logical calculation when a rate of change (dBk) is 3%/min.;

FIG. 19 is an explanatory view of a fuzzy logical calculation when a deviation (eLg) is −4 mm;

FIG. 22 is an explanatory view of fuzzy logical calcuation when a rate of change (dBk) is −4%/min.;

FIG. 23 is an explanatory view of fuzzy logical calculation when a deviation (eLg) is 7 mm;

FIG. 24 is an explanatory view of fuzzy logical calculation when a rate of change (dLg) is −2 mm/min.;

FIG. 25 is an explanatory view in the case where when a rate of change (dBk) is −4%/min., a deviation (eLg) is 7 mm and a rate of change (dLg) is −2 mm/min., an operating amount of an absorption liquid pump is obtained;

FIG. 26 is a view showing a fuzzy rule between a rate of change (dTci) of a temperature of a high temperature generator and an operating amount;

FIG. 27 is a view showing a fuzzy rule between a rate of change (dTg) of an inlet temperature of cooling water and an operating amount;

FIG. 28 is a view defining a membership function of a fuzzy variable to a rate of change (dTci);

FIG. 29 is a view defining a membership function of a fuzzy variable to a rate of change (dTg);

FIG. 30 is an explanatory view of fuzzy logical calculation when a rate of change (dTci) is −1.7°/min.;

FIG. 31 is an explanatory view of fuzzy logical calculation when a rate of change (dTg) is −0.8° C./min.

DESCRIPTION OF THE PREFERRED EMBODIMENTS

Figure 1:
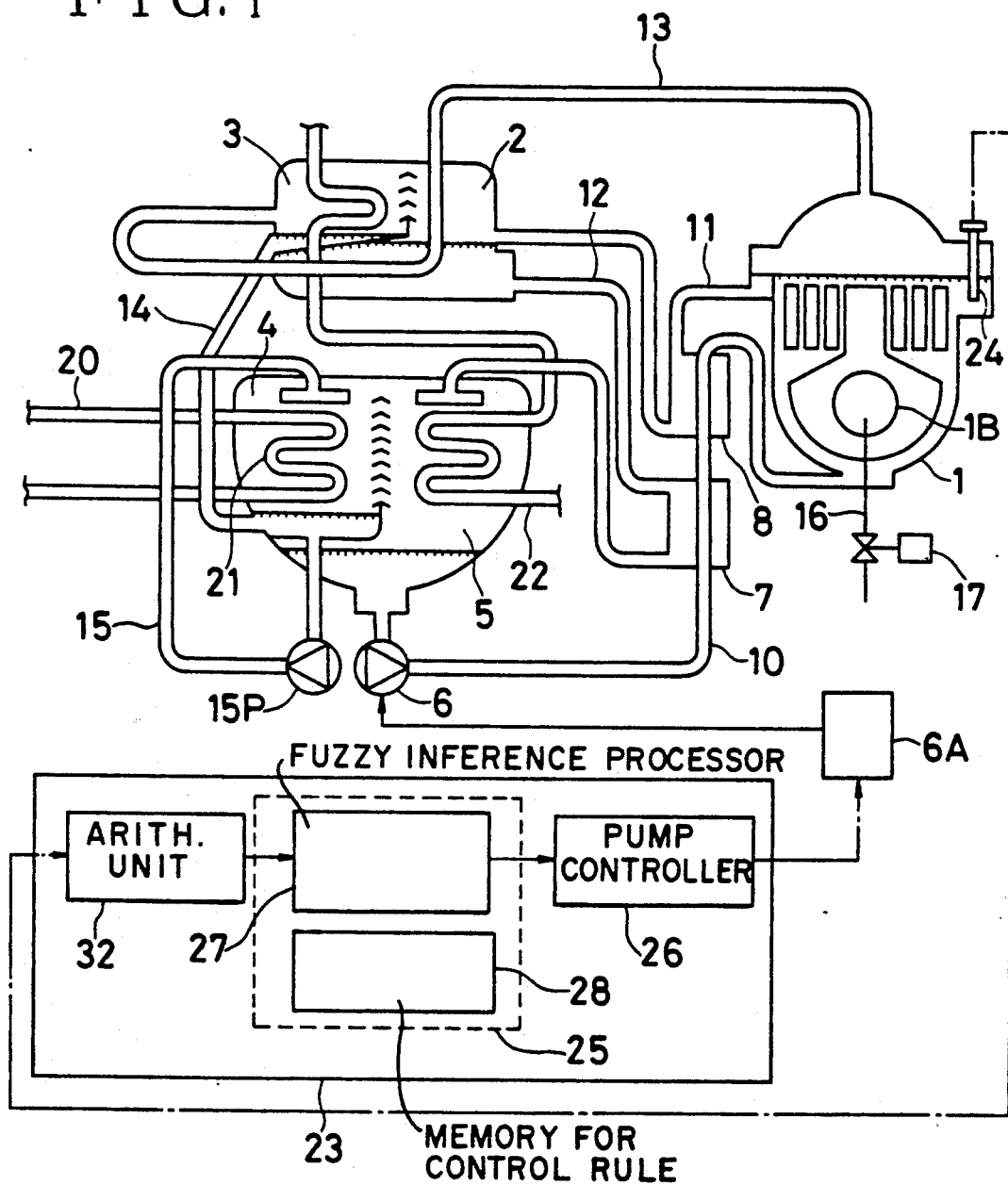
FIG. 1 is a circuit diagram of an absorption refrigeration machine showing a first embodiment and a second embodiment of the present invention.

FIG. 1 shows a double-effect absorption refrigeration machine in which water and a lithium-bromide (LiBr) aqueous solution are used for a refrigerant and an absorbent (solution), respectively. There are provided a high temperature generator 1 provided with a burner 1B, a low temperature generator 2, a condenser 3, an evaporator 4, an absorber 5, an absorption liquid pump 6, an inverter device 6A for supplying an electric power of a predetermined frequency to the absorption liquid pump 6, a low temperature heat exchanger and a high temperature heat exchanger 7 and 8, respectively, a dilute absorption liquid pipe 10, an intermediate absorption liquid pipe 11, a concentrated absorption liquid pipe 12, a refrigerant pipe 13, a refrigerant down pipe 14, and a refrigerant circulation pipe 15, which are connected as shown in FIG. 1. A refrigerant pump 15P is provided in the midst of the refrigerant circulation pipe 15. A fuel control valve 17 is provided in the midst of a fuel supply pipe 16 connected to the burner 1B. An evaporator heat exchanger 21 is provided in the midst of a cold water pipe 20. Reference numeral 22 designates a cooling water pipe.

Reference numeral 23 designates a microcomputer control panel for an absorption refrigeration machine and 24 designates a liquid surface detector provided on the high temperature generator 1. The liquid surface detector 24, the absorption liquid pump 6 and the inverter device 6A are connected to the microcomputer control panel 23. The microcomputer control panel 23 is provided with a microcomputer processor 25 for executing a fuzzy inference on the basis of an absorption lquid level of the high temperature generator 1 and a control device 26 for the absorption liquid pump 6. The microprocessor 25 comprises a fuzzy inference processor (arithmetic unit) 27 and a memory device 28 for a control rule. The fuzzy inference processor 27 uses a deviation from a set value of an absorption liquid surface to logically calculate a frequency of electric power, i.e., an operating amount supplied to the absorption liquid pump 6 and to output the resulting operating amount to the control device 26. The control device 26 controls the frequency of electric power supplied to the absorption liquid pumpt 6 on the basis of the aforesaid operating amount. In this embodiment, the frequency is output from the fuzzy inference processor 27. The memory device 28 for the control rule stores a control rule and a membership function required for fuzzy inference calculations executed by the fuzzy inference processor 27. An arithmetic unit indicated at 32 inputs data of an absorption liquid surface of the liquid surface detector 24 to calculate a deviation from a set value.

The fuzzy logical calculation for obtaining the frequency of electric power supplied to the absorption liquid pump 6 is executed on the basis of the control rule and the membership function described hereinbelow. The control rule (fuzzy rule) stored in the memory device 28 on the basis of the human experiences will be described hereinafter.

$R_1$: If an absorption liquid surface is considerably higher than a set value, that is, if a deviation ($eT_o$) from a set value of an absorption liquid surface is PB (Positive Bid), an operating amount KQ, that is, a frequency immediately reduces (NB).

$R_2$: If an absorption liquid surface is slightly higher than a set value, that is, if a deviation ($eT_o$) is PB (Positive small), a frequency gradually reduces (NS).

$R_3$: If an absorption liquid surface is equal to a set value, that is, if a deviation ($eT_o$) is ZR (Zero), a frequency is maintained (ZR) as it is.

$R_4$: If an absorption liquid surface is slightly lower than a set value, that is, if a deviation ($eT_o$) is NS (Negative Small), a frequency gradually increases (PS).

$R_5$: If an absorption liquid surface is considerably lower than a set value, that is, a deviation ($eT_o$) is NB (Negative Big), a frequency immediately increases (PB).

The aforesaid $R_1$ to $R_4$ indicate control rules, which are as shown in FIG. 3.

Membership functions for the qualitative evaluation of the magnitude of a deviation from a set value of an absorption liquid surface, that is, membership functions for fuzzy variables PB, PS, ZR, NS and NB with respect to the deviation are defined as shown in FIG. 2.

Further, membership functions for converting the qualitatively evaluated operating amount of the absorption liquid pump 6 into a quantitative value, that is, membership functions for fuzzy variables PB, PS, ZR, NS and NS with respect to the frequency of electric power supplied to the absorption liquid pump 6 are defined as shown in FIG. 4.

The fuzzy logical calculation is carried out in the fuzzy inference processor 27 using the control rules shown in FIG. 3 and the membership functions shown in FIG. 4 to obtain the operating amount of the absorption liquid pump 6.

The operation of the absorption refrigeration machine will be described hereinbelow. When the absorption refrigeration machine is in operation, the burner 1B is burnt and the absorption liquid pump 6 and the refrigerant pump 15P are operated so that the absorption liquid and the refrigerant are circulated in a manner similar to the conventional absorption refrigeration machine. The refrigerant is scattered by the evaporator 4 to the evaporator heat exchanger 21, and cold water lowered in temperature in the evaporator heat exchanger 21 is supplied to loads.

The control of the frequency of electric power supplied to the absorption liquid pump 6 when the absorption refrigeration machine is being operated as described above will be explained below.

During the operation of the absorption refrigeration machine, an opening degree of the fuel control valve 17, that is, the heating amount of the high temperature generator 1 is controlled on the basis of the outlet temperature of cold water. The liquid surface detector 24 detects an absorption liquid surface of the high temperature generator 1. The liquid surface data is given to the arithmetic unit 32 of the control panel 23, and a deviation from a set value of the absorption liquid surface is calculated and given to the fuzzy inference processor 27. The fuzzy inference processor 27 uses membership functions of fuzzy variables with respect to the deviation from the set value of the absorption liquid surface stored in the memory device 28 to calculate membership values with respect to the absorption liquid surface. A rate satisfied with the fact that the absorption liquid surface is considerably higher than the set value in the first portion of the control rules $R_1$-$R_5$, i.e., $R_1$, is calculated by the fuzzy logic product. The rate at which the first portion is established every control rules $R_1$-$R_5$ is multiplied by the membership functions of the fuzzy variables PB, PS, ZR, NS and NB to correct the membership functions.

Next, the operating amount of the absorption liquid pump 6 according to the deviation from the set value of the absorption liquid surface, that is, the operating amount of the frequency of electric power supplied to the absorption liquid pump 6 is obtained by the corrected membership functions of the control rules.

When the deviation of the absorption liquid surface is −6 mm, the logical calculation is carried out as shown in FIG. 8 by the membership functions and the control rules to obtain a membership value (A), and the operating amount of the frequency of electric power (hereinafter referred to the frequency of the absorption liquid pump) supplied to the absorption liquid pump 6 is obtained from a center of gravity (g) of the membership value (A). The frequency of the absorption liquid pump 6, a signal of +4 Hz in this case, is output to the control device 26, and a frequency signal obtained by adding 4 Hz to the previous frequency is output from the control device 26 to the inverter device 6A. Therefore, the frequency of electric power supplied from the inverter device 6A to the absorption liquid pump 6 increases, teh rotational speed of the absorption liquid pump 6 increases, and the discharge amount of the absorption liquid increases according to the deviation of the absorption liquid surface of the high temperature generator 1. Also in the case where the absorption liquid surface is higher than the set value and the deviation is plus (+), the fuzzy logical calculation is carried out similarly to the case where the deviation is minus (−) to obtain the frequency of the absorption liquid pump 6. The frequency of electric power supplied to the absorption liquid pump 6 decreases, the rotational speed of the absorption liquid pump 6 is lower, and the discharge amount of the absorption liquid decreases. Also in the case where the temperature of cooling water is changed, or a deviation between the absorption liquid surface and the set value occurs when the absorption refrigeration machine starts, etc., the fuzzy logic calculation is carried out similarly to the former.

According to the above-described embodiment, human experiences in connection with the control of the frequency of the absorption pump 6 corresponding to the deviation from the set value of the absorption liquid surface are stored as the control rules and membership functions in the memory device 28, and the control of the frequency of the absorption liquid pump 6 on the basis of human experiences can be carried out by the fuzzy logical calculation. The rotational speed of the absorption liquid pump 6 can be changed to control the flow rate of absorption liquid to the high temperature generator 1 according to the deviation from the set value of the absorption liquid surface. As the result, the coefficient of result of the absorption refrigeration machine can be enhanced.

A second embodiment will now be described in which the frequency of the absorption liquid pump 6 is subjected to fuzzy inference using the deviation from the set value of the absorption liquid surface and the rate of change of the absorption liquid surface. Stored in the memory device 28 are, in addition to the aforementioned membership functions and control rules, control rules and membership functions in connection with the rate of change (mm/min) of the absorption liquid surface on the basis of human experiences. Control rules $R_1$ to $R_5$ will be described hereinbelow.

$R_1$: If the absorption liquid surface rapidly rises, that is, the rate of change ($dT_o$) is PB, the operating amount (KQ), that is, the frequency immediates decreases (NB).

$R_2$: If the absorption liquid surface gently rises, that is, the rate of change ($dT_o$) is PS, the operating amount (KG) gradually decreases (NS).

$R_3$: In the case where the absorption liquid surface remains unchanged, that is, the rate of change ($dT_o$) is ZR, the operating amount (KG) remains unchanged.

$R_4$: If the absorption liquid surface gently lowers, that is, the rate of change ($dT_o$) is NS, the operating amount (KG) gradually increases (PS).

$R_5$: If the absorption liquid surface rapidly lowers, that is, the rate of change ($dT_o$) is NB, the operating amount (KQ) rapidly increases (PB).

The control rules of $R_1$ to $R_5$ are as shown in FIG. 6.

Membership functions of fuzzy variables PB, PS, ZR, NS and NB with respect to the rate of change of the absorption liquid surface are as shown in FIG. 5. Membership functions of fuzzy variables PB, PS, ZR, NS and NB with respect to an opening degree of the fuel control valve 17 are as shown in FIG. 7.

The fuzzy logical calculation is carried out by the fuzzy inference processor 27 using the control rules shown in FIG. 6 and the membership functions shown in FIG. 7 to obtain an operating amount.

The control rules and membership functions with respect to the rate of change of the absorption liquid surface, and the control rules and membership functions with respect to the deviation from the set value of the absorption liquid surface are stored in the memory device 28. The arithmetic unit 32 calculates, in addition to the deviation, the rate of change (a change of an absorption liquid surface per minute) (mm/min) on the basis of the absorption liquid surface. During the operation of the absorption refrigeration machine, the fuzzy logical calculation is carried out in the fuzzy inference processor 27 by the control rules and membership functions on the basis of the deviation from the set value of the absorption liquid surface similar to the aforementioned first embodiment to obtain a membership value of the frequency amount of the absorption liquid pump 6 according to the deviation. When the deviation is −6 mm, the membership value is (A) in FIG. 8 similar to the first embodiment. The fuzzy inference calculation is carried out in the fuzzy inference processor 27 by the control rules shown in FIG. 6 and the membership functions shown in FIGS. 5 and 7 on the basis of the rate of change of the absorption liquid surface to obtain a membership value of the frequency of the absorption liquid pump 6 according to the rate of change. When the rate of change is, for example, −8 mm/min, a membership value (B) as shown in FIG. 9 is obtained. The logical sum of the membership values (A) and (B) of the above-described frequencies (operating amounts) are obtained by the fuzzy inference processor 27, and the frequency is obtained from the center of gravity of the logical sum and output to the control device 26. A frequency signal obtained by adding the aforesaid frequency to the previous frequency is output from the control device 26, and the frequency of electric power supplied to the absorption liquid pump 6 is maintained at an optimum value.

According to the second embodiment, the human experiences in connection with the control of the absorption liquid pump 6 corresponding to the deviation from the set value of the absorption liquid surface and the rate of change are stored as the control rules and membership functions in the memory device 28, and the frequency of the absorption liquid pump 6 on the basis of human experiences can obtained by the fuzzy inference. In the case where the absorption liquid surface is changed due to the rapid change of load, the frequency of electric power supplied to the absorption liquid pump 6 is controlled on the basis of human experiences, and the amount of the absorption liquid flowing from the absorber 5 to the high temperature generator 1 can be maintained at an optimum value. The absorption liquid surface can be maintained at a substantially constant.

The responsiveness to the change in the absorption liquid surface is quick as compared with the case where the frequency of electric power supplied to the absorption liquid pump 6 is subjected to PID control. In the case where the absorption liquid surface is changed, the absorption liquid surface can be stabilized to the set value in a short period of time.

When the absorption liquid surface lowers close to a low liquid surface of the high temperature generator 1 (a liquid level at which operation of the absorption refrigeration machine stops for the sake of safety), the frequency of electric power supplied to the absorption liquid pump 6 considerably increases, and therefore, the aforesaid low liquid surface occurs to avoid stopping the operation of the absorption refrigeration machine.

It is to be noted that the deviation from the set value of the absorption liquid surface, the control rules in connection with the rate of change of the absorption liquid surface and the membership functions are not limited to the aforementioned embodiments but they are determined according to the refrigeration ability of the absorption refrigeration machine and the ability of the absorption liquid pump 6.

While in the above-described embodiments, the frequency of electric power supplied to the absorption liquid pump has been controlled by the fuzzy logical calculation, it is to be noted that also in the case where control rules are constituted between the absorption liquid surface and the rotational speed of the absorption liquid pump, and membership functions of the rotational speed of the absorption liquid pump are prepared so that the rotational speed of the absorption liquid pump is controlled by the arithmetic result of the fuzzy inference calculation, the function and effects similar to those of the aforementioned embodiments can be obtained. Also in the case where a control valve is provided in an absorption liquid pipeline extending from an absorber to a generator and control rules are constituted between the absorption liquid surface and an opening degree of the control valve, or membership functions of an opening degree of the control valve are prepared so that the opening degree of the control valve is controlled by the arithmetic result of the fuzzy logical calculation, the function and effects similar to the former can be obtained.

Figure 10:
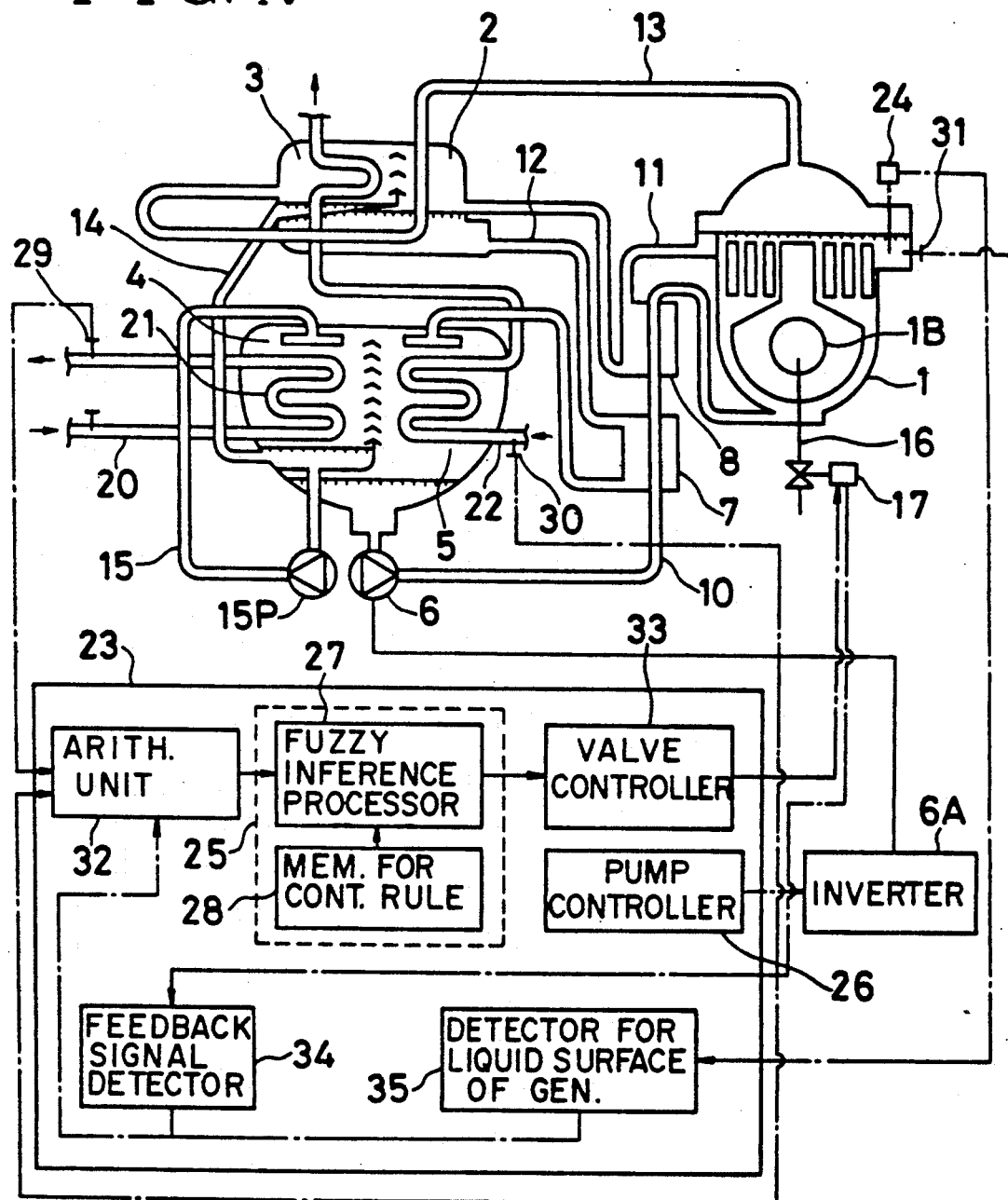
FIG. 10 is a circuit diagram of an absorption refrigeration machine showing a third embodiment and a fourth embodiment of the present invention.

FIG. 10 illustrates a third embodiment and a fourth embodiment, in which case, also, there are provided a high temperature generator 1 provided with a burner 1B, a low temperature generator 2, a condenser 3, an evaporator 4, an absorber 5, an absorption liquid pump 6, a low temperature heat exchanger 7 and a high temperature heat exchanger 8, a dilute absorption liquid pipe 10, an intermediate absorption liquid pipe 11, a concentrated absorption liquid pipe 12, a refrigerant pipe 13, a refrigerant liquid down pipe 14, a refrigerant liquid circulation pipe 15, a refrigerant pump 15P, a fuel supply pipe 16, a fuel control valve 17, a cold water pipe 20, an evaporator heat exchanger 21, a cooling-water pipe 22, an inverter 6A, etc., which are connected similar to FIG. 1 to constitute a double-effect absorption refrigeration machine, which is controlled by a microcomputer control panel 23. To the microcomputer control panel 23 are connected a cold water outlet temperature detector 29 provided in the cold water pipe 20, a cooling water inlet temperature detector 30 provided in the cooling water pipe 22, a temperature detector 31 provided in the high temperature generator 1, said fuel control valve 17 and a liquid surface detector 24. The microcomputer control panel 23 is provided with a microcomputer 25, a control device 26 for the absorption liquid pump 6, an arithmetic unit 32, a control device 33 for the fuel control valve 17, a feedback signal control device 34 and a generator liquid surface detection device 35. The microprocessor 25 comprises a fuzzy inference processor (arithmetic unit) 27 and a memory device 28 for control rules. The arithmetic unit 32 inputs a signal from the cold water outlet temperature detector 29 to calculate a deviation from a set value of a cold water outlet. The feedback signal detector 34 inputs a signal of a valve opening degree of the fuel control valve 17 to output the opening degree to the arithmetic unit 32. The generator liquid surface detection device 35 inputs a signal from the liquid surface detector 24 to output a level of the liquid surface to the arithmetic unit 32.

The arithmetic unit 32 calculates a rate of change of an opening degree of the fuel control valve 17 for a predetermined time (for example, one minute), a deviation from an optimum value of the liquid level of the high temperature generator 1, and a rate of change of a liquid level of the high temperature generator 1 for a predetermined time. The fuzzy inference processor 27 performs the fuzzy logical calculation on the basis of the rate of change of the opening degree of the fuel control valve 17 input from the arithmetic unit 32, the deviation from the optimum value of the liquid level of the high temperature generator 1, the rate of change of the liquid level of the high temperature generator 1 for a predetermined time, and fuzzy rules and membership functions input from the memory device 28.

Figures 11, 12, 13, 14:
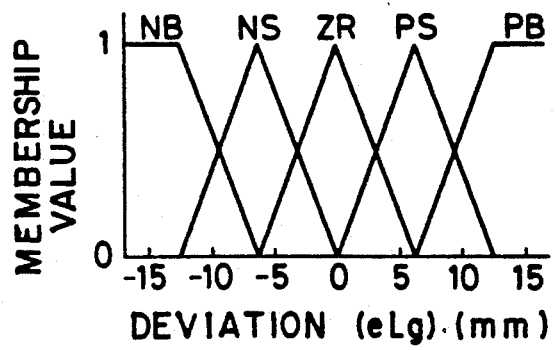
FIG. 11 is a view showing a fuzzy rule between a deviation (elg) from an optimum value of an absorption liquid surface and an operating amount (dIn)
FIG. 12 is a view showing a fuzzy rule between a rate of change (dLg) of an absorption liquid surface and an operating amount (dIn)
FIG. 13 is a view showing a fuzzy rule between a rate of change (dBk) of an opening degree of a fuel control valve and an operating amount (dIn)
FIG. 14 is a view defining a membership function of a fuzzy variable to a deviation (eLg)

Stored in the memory device 28 are fuzzy rules and membership functions required for the fuzzy logical calculation on the basis of the human experiences. Stored in the memory device 28 are fuzzy rules of the operating amount of the fuel control valve 17 with respect to the deviation (eTo) from the set value of the cold water outlet temperature. Stored in the memory device 28 are fuzzy rules of an operating amount (dIn) of the absorption liquid pump 6 with respect to a deviation (eLg) from an optimum value (a set value) of the liquid surface of the high temperature generator 1 shown in FIG. 11, fuzzy rules of an operating amount (dIn) of the absorption liquid pump 6 with respect to a rate of change (dLg) of the liquid surface of the high temperature generator 1 shown in FIG. 12, and fuzzy rules of an operating amount (dIn) of the absorption liquid pump 6 with respect to a rate of change (dBk) of an opening degree of the fuel control valve 17 shown in FIG. 13. In FIGS. 11, 12 and 13, PB stands for Positive Big; PS for Positive Small; ZR for Zero; NS for Negative Small; and NB for Negative Bid.

Further stored in the memory device 28 are membership functions for qualitatively evaluating the deviation (eLg), the rate of change (dLg) and the rate of change (dBk) shown in FIGS. 14, 15 and 16 and membership functions of an operating amount (frequency) (dIn) of the absorption liquid pump 6 shown in FIG. 17. Membership functions shown in FIG. 17 are those for changing the operating amount of the absorption liquid pump qualitatively evaluated into a quantative value.

The fuzzy logical calculation is carried out in the fuzzy inference processor 27 on the basis of the liquid surface of the high temperature generator 1 and the opening degree of the fuel control valve 17 by the aforementioned fuzzy rules and membership functions to obtain the operating amount of the absorption liquid pump 6, that is, the amount of change of the frequency of electric power supplied to the absorption liquid pump 6.

The operation of the absorption refrigeration machine will be described hereinafter. During the operation of the absorption refrigeration machine, fuel is supplied to the high temperature generator 1, and the burner 1B burns and the absorption liquid pump 6 and the refrigerant pump 15P are operated. The absorption liquid and refrigerant are circulated similar to the conventional aborption refrigeration machine. The refrigerant liquid is scattered by the evaporator 4 to the evaporator heat exchanger 21, and the cold water lowered in temperature is supplied from the evaporator 4 to the load. Cooling water flowing into the cooling water pipe 22 takes heat at the absorber 5 adn the condenser 3, and the temperature rises.

The fuzzy logical calculation is carried out in the fuzzy inference processor 27 on the basis of the deviation from the set value of the cold water outlet temperature and the fuzzy rules and membership functions stored in the memory device 28. The operating amount of the fuel control valve 17 is calculated, and the opening-degree signal is output from the control device 33 for the valve to the fuel control valve 17. The opening degree of the fuel control valve 17 is controlled by the cold water outlet temperature to change the heating amount of the high temperature generator 1, and the cold water outlet temperature is maintained at a set temperature.

The feedback signal detection device 34 inputs an opening-degree signal as an analog signal from the fuel control valve 17, and converts it into a digital signal, which is output to the arithmetic device 32. The arithmetic device 32 calculates the rate of change of the opening degree of the fuel control valve 17 to output it to the fuzzy inference processor 27. The fuzzy inference processor 27 performs the fuzzy logical calculation on the basis of the fuzzy rules and membership functions stored in the memory device 28. In the case where the cold water outlet temperature rises and the rate of change (dBk) of the opening degree of the fuel control valve 17 is, for example, 3%/min, the fuzzy inference processor 27 performs the fuzzy logical calculation as shown in FIG. 18 on the basis of the fuzzy rules of FIG. 13 and the membership functions and the rate of change (dBk) of FIG. 16. The membership value $M_1$ (indicated by the oblique line in FIG. 18) of the operating amount (dIn) of the absorption liquid pump 6 based on the rate of change (dBk) is obtained.

The generator liquid surface detection device 35 inputs an absorption liquid surface from the liquid surface detector 24 and converts it into a digital signal, which is output to the arithmetic unit 32. The arithmetic unit 32 calculates the deviation (eLg) from the optimum value of the aforesaid liquid surface and the rate of change (dLg) to output them to the fuzzy inference processor 27. The fuzzy inference processor 27 performs the fuzzy logical calculation on the basis of the fuzzy rules shown in FIGS. 11 and 12 and the membership functions shown in FIGS. 14, 15 and 17. In the case where the liquid surface is lower by 4 mm, for example, than the set value, that is, the deviation (eLg) is −4 mm, the fuzzy inference processor 27 performs the fuzzy inference calculation as shown by the one-dotted lines in FIG. 19. Then, the membership value $M_2$ (shown by the oblique line in FIG. 19) of the operating amount (dIn) of the absorption liquid pump 6 is obtained from −4 mm of the deviation (eLg) of the first portion. In the case where the rate of change (dLg) of the liquid surface is, for example, −3.5 mm/min, the fuzzy inference processor 27 performs the fuzzy logical calculation as shown in one-dotted line in FIG. 20. The membership value $M_3$ (shown by the broken line in FIG. 20) of the operating amount (dIn) of the absorption liquid pump 6 from −3.5 mm/min of the rate of change (dLg) of the first portion.

Figure 20:
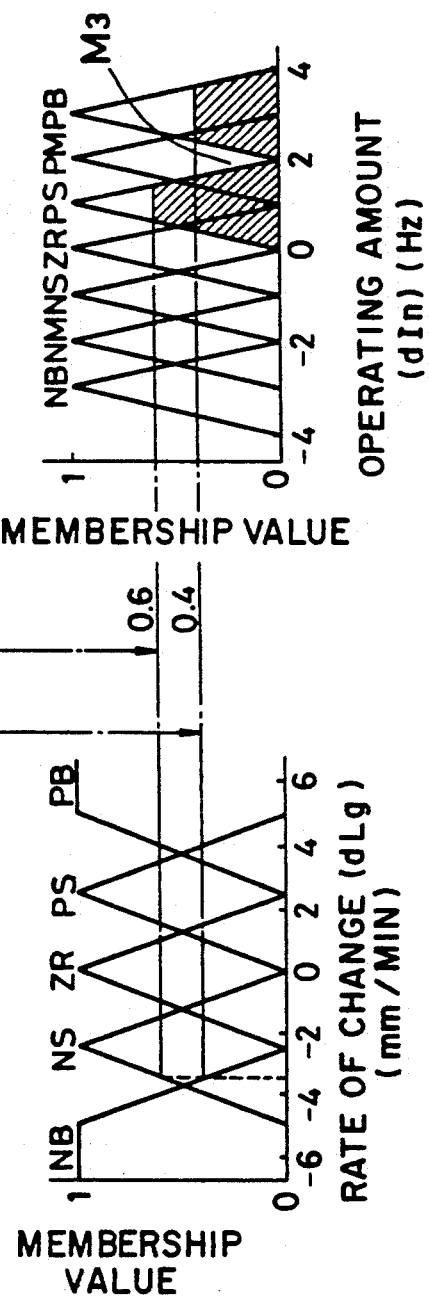
FIG. 20 is an explanatory view of fuzzy logical calculation when a rate of change (dLg) is −3.5 mm/min.
Figure 21:
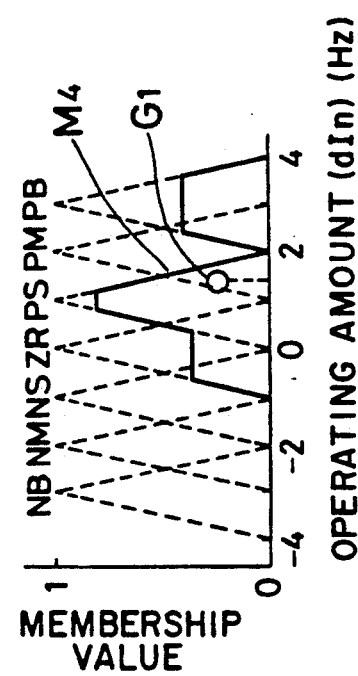
FIG. 21 is an explanatory view in the case where when a rate of change (dBk) is 3%/min., a deviation (eLg) is −4 mm, and a rate of change (dLg) is −3.5 mm/min., an operating amount is obtained by MAX centroid calculation method.

The fuzzy inference processor 27 then obtains the logic sum of the membership values $M_1$, $M_2$ and $M_3$ shown in FIGS. 18, 19 and 20 by MAX centroid calculation method, for example. The membership values in the logic sum are $M_4$ shown in FIG. 21 which is a contour when the membership values $M_1$, $M_2$ and $M_3$ are overlapped. Then, the operating amount of the absorption liquid pump 6 is determined from the average value of the membership value $M_4$, that is, from the centroid $G_1$. The fuzzy inference processor 27 outputs the operating amount to the control device 26 for the pump. The control device 26 outputs a signal of frequency obtained by adding the aforesaid operating amount to the frequency so far output to the inverter device 6A. The inverter device 6A supplies an electric power of frequency input to the absorption liquid pump 6 so that the rotational speed of the absorption liquid pump 6 increases. The discharge amount of the absorption liquid of the absorption liquid pump 6 increases.

Also in the case where the rate of change (dBk) of the opening degree of the fuel control valve 17 is, for example, $-4\%/min$; the deviation (eLg) from the optimum value of the liquid surface of the high temperature generator 1 is, for example, 7 mm; and the rate of change (dLg) of the liquid surface of the high temperature generator 1 is, for example, $-2$ mm/min, the fuzzy logical calculation is carried out by the fuzzy rules shown in FIGS. 11, 12 and 13 and the membership functions shown in FIGS. 14, 15, 16 and 17. The fuzzy logical calculation is carried out as shown in FIG. 22 from $-4\%/min$ of the rate of change (dBk) to obtain the membership value $M_5$ of the operating amount of the absorption liquid pump 6. The fuzzy logical calculation is carried out as shown in FIG. 23 from 7 mm of the deviation (eLg) to obtain the membership value $M_6$ of the operating amount of the absorption liquid pump 6. The fuzzy logical calculation is carried out as shown in FIG. 24 from $-2$ mm/min of the rate of change (dLg) to obtain the membership value $M_7$ of the operating amount of the absorption liquid pump 6. The membership value of the logic sum of the membership values $M_5$, $M_6$ and $M_7$ is $M_8$ of FIG. 25. The operating amount of the absorption liquid pump 6 is determined from the average value of the membership value $M_8$, that is, the centroid ($G_2$). This operating amount is output from the fuzzy inference processor 27 to the control device 26 for the pump. The control device 26 outputs a signal of frequency obtained by subtracting the aforesaid operating amount from the previous frequency to the inverter device 6A. For this reason, the frequency of electric power supplied from the inverter device 6A to the absorption liquid pump 6 is lower, the discharge amount of the dilute absorption liquid of the absorption liquid pump 6 decreases, and the amount of dilute absorption liquid sent to the high temperature generator 1 decreases.

According to the above-described embodiment, the fuzzy logical calculation is carried out on the basis of human experiences by the rate of change (dBk) of the opening degree of the fuel control valve 17, the deviation (eLg) from the set value of the liquid surface of the high temperature generator 1 and the rate of change (dLg) of the liquid surface to control the operating amount of the absorption liquid pump 6. Therefore, the discharge amount of the dilute absorption liquid of the absorption liquid pump 17 is changed according to the heating amount of the high temperature generator 1, and rapid and gentle changes of the liquid surface, and the liquid surface of the high temperature generator 1 can be maintained constant, as a consequence of which the heating efficiency of the absorption liquid of the high temperature generator 1 can be enhanced. In the absorption refrigeration machine in which a vapor of high temperature and high pressure is supplied from, for example, a gas engine generator to the high temperature generator 1, the absorption liquid pump 17 is controlled on the basis of human experiences by the fuzzy logical calculation whereby the lowering of the liquid surface can be prevented to prevent a heat transfer area from being reduced, as a consequence of which higher efficiency in the high temperature generator can be attained.

Furthere, it is possible to prevent a mixture of absorption liquid into a refrigerant vapor due to a rise of liquid surface of the hight temperature generator 1 and lostburing due to a lowering of liquid surface.

A fourth embodiment of the present invention will be described hereinafter. In the fourth embodiment, the structure not particularly described is similar to that of the third embodiment, details of which are omitted. Reference numeral 30 designates a cooling water inlet temperature detector provided in the cooling water pipe 22 on the inlet side of the absorber 5, and 31 is a temperature detector provided in the high temperature generator 1, as previously mentioned, which are wired so as to output temperature signals to the arithmetic unit 32. The arithmetic unit 32 calculates a rate of change (dTci), for example, every one minute, of a cooling water temperature, and a rate of change (dTg), for example, every one minute, of a temperature of the high temperature generator. The arithmetic unit 32 calculates a rate of change (dBk) of the opening degree of the fuel control valve, a deviation (eLg) of the high temperature generator 1, and a rate of change (dLg), similar to the first embodiment described above.

Stored in the memory device 28 for control rules are fuzzy rules shown in FIGS. 11, 12 and 13 of the third embodiment, membership functions shown in FIGS. 14, 15, 16 and 17, fuzzy rules of a rate of change (dTci) of a cooling water inlet temperature shown in FIG. 26, fuzzy rules of a rate of change (dTg) of the temperature of the high temperature generator shown in FIG. 27, membership functions of a rate of change (dTci) of a cooling water inlet temperature shown in FIG. 28, and membership functions of a rate of change (dTg) of the temperature of the high temperature generator shown in FIG. 29.

In the case, during the operation of the absorption refrigerant machine, the rate of change (dBk) of the opening degree of the fuel control valve 17 is 3%/min, the deviation (eLg) of the liquid surface of the high temperature generator 1 is $-4$ mm, and the rate of change (dLg) of the liquid surface is $-3.5$ mm/min, similar to the first embodiment, the fuzzy inference processor 27 performs the fuzzy logical calculation as shown in FIGS. 18, 19 and 20 to obtain membership values. At this time, the arithmetic unit 32 calculates the rate of change (dTci) of the cooling water inlet temperature on the basis of the temperature of the cooling water on the inlet side of the absorber 5 detected by the cooling water inlet temperature detector 30. In the case where the temperature of the cooling water is gradually lowered, and the rate of change (dTci) is, for example, $-1.7°$ C./min, the fuzzy inference processor 27 performs the fuzzy logical calculation as indicated by the one-dotted lines in FIG. 30. A membership value $M_9$ of the operating amound (dIn) of the absorption liquid pump 6 (shown by the oblique line in FIG. 30) is obtained from $-1.7°$ C./min of the rate of change (dTci). At this time, in the case where the rate of change (dTg) of the temperature of the high temperature generator is, for example, $-0.8°$ C./min, the fuzzy inference processor 27 performs the fuzzy logical calculation as shown by the one-dotted lines in FIG. 31. A membership value $M_{10}$ (shown by the oblique line in FIG. 31) of the operating amount (dIn) of the absorption liquid pump 6 is obtained from $-0.8°$ C./min of the rate of change (dTg) of the first portion.

Figure 32:
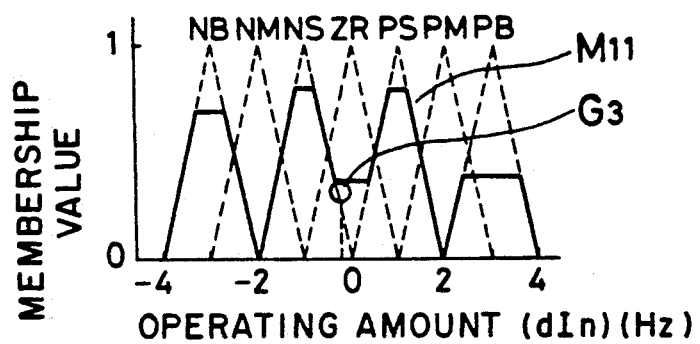
FIG. 32 is an explanatory view in the case where when a rate of change (dBk) is 3%/min., a deviation (eLg) is −4 mm, a rate of change (dLg) is −3.5 mm/min., a rate of change (dTci) is −1.7° C./min., and a rate of change (dTg) is 0.8° C./min., an operating amount of an absorption liquid pump is obtained.

The fuzzy inference processor 27 obtains the logic sum of the membership values $M_1$, $M_2$, $M_3$, $M_9$ and $M_{10}$ shown in FIGS. 18, 19, 20, 30 and 31. The membership value of the logic sum is $M_{11}$ of FIG. 32 which is a contour when the membership values $M_1$, $M_2$, $M_3$, $M_9$ and $M_{10}$ are overlapped. An average value of the maximum values of the membership values is obtained. The operating amount of the absorption liquid pump 6 is determined from the average value (centroid) $G_3$. The operating amount is output to the control device 26 for the pump. The control device 27 outputs a signal of frequency obtained by adding the operating amount to the previous frequency to the inverter device 6A. For this reason, the frequency of electric power supplied to the absorption liquid pump 6 is changed and the discharge amount of the dilute absorption liquid of the absorption liquid pump 6 is changed.

Thereafter, similarly, the fuzzy logical calculation is carried out in the fuzzy inference processor 27 on the basis of the rate of change (dBk) of the opening degree of the fuel control valve 17, the deviation (eLg) of the liquid surface of the high temperature generator 1 and the rate of change (dLg) of the liquid surface, the rate of change (dTci) of the cooling water inlet temperature and the rate of change (dTg) of the temperature of the high temperature generator 1 to change the frequency of electric power supplied to the absorption liquid pump 6. For this reason, the discharge amount of the dilute absorption liquid of the absorption liquid pump is changed, and the amount of the dilute absorption liquid sent to the high temperature generator 1 is changed.

According to the above-described embodiment, the fuzzy logical calculation is carried out on the basis of human experiences by the rate of change (dBk) of the opening degree of the fuel control valve 17, the deviation (eLg) of the liquid surface and the rate of change (dLg) of the liquid surface of the high temperature generator 1, the rate of change (dTci) of the cooling water inlet temperature and the rate of change (dTg) of the temperature of the high temperature generator 1 to control the operating amount of the absorption liquid pump 6. Therefore, when the heating amount of the high temperature generator 1, the liquid surface of the high temperature generator 1, the inlet temperature of the cooling water or the temperature of the high temperature generator 1 is changed, the amount of the dilute absorption liquid sent to the high temperature generator 1 on the basis of human experience is changed, and the liquid surface of the high temperature generator 1 can be maintained constant, as a consequence of which the heating efficiency of the absorption liquid of the high temperature generator 1 can be enhanced.

While in the aforementioned first and second embodiments, the rotational speed of the absorption liquid pump 6 is controlled on the basis of the fuzzy logical calculation to adjust the amount of the absorption liquid which flows from the absorber 5 to the high temperature generator 1, it is to be noted that for example, in the case where a control valve is provided in the intermediate absorption liquid pipe 11, an opening degree of the control valve is controlled on the basis of the fuzzy logical calculation to adjust the amount of the absorption liquid which flows from the high temperature generator 1 to the absorber 5, the function and effects similar to the above-described respective embodiments can be obtained.

The present invention provides a control device for an absorption refrigeration machine constructed as described above, in which plural amounts of changes representative of external conditions or internal conditions are detected, and the rotational speed of the absorption liquid pump is controlled by the fuzzy logical calculation. Therefore, when the liquid surface of the high temperature generator or the heating amount of the high temperature generator is changed, the rotational speed of the absorption pump is controlled on the basis of human experiences. When the load is changed, the circulation amount of the absorption liquid is controlled to the optimum level to enhance the heating efficiency of the high temperature generator. Furthermore, it is possible to prevent a mixture of absorption liquid into refrigerant liquid due to a rise of liquid surface and to prevent lost-burning due to a considerable lowering of liquid surface.

Moreover, there are provided a liquid surface detector provided on the high temperature generator and a mechanism for inputting a signal from the liquid surface detector, comparing the detected liquid surface with a set value and frequency-controlling the absorption liquid pump by the fuzzy logical calculation. Therefore, it is possible to control the frequency of electric power supplied to the absorption liquid pump on the basis of human experiences in connection with the frequency with respect to a deviation between the absorption liquid surface and the set value, and as a result, the control of the absorption liquid pump according to the deviation from the set value of the absorption liquid surface.

Furthermore, there are provided a liquid surface detector and a mechanism for controlling the rotational speed of the absorption liquid pump by the fuzzy logical calculation on the basis of the deviation from the set value of the absorption liquid surface detected by the liquid surface detector, the rate of change of the absorption liquid surface, the membership functions and the fuzzy rules. Therefore, in the case where the absorption liquid surface is changed due to the change of load or change of cooling water temperature, the rotational speed of the absorption liquid pump can be controlled on the basis of human experiences, and as a result, the absorption liquid surface can be maintained substantially constant.

In addition, there are provided a detection device for detecting information such as temperature or liquid surface of the high temperature generator, a memory device for storing fuzzy rules and membership functions for obtaining an operating amount of an absorption liquid pump with respect to the information obtained by the detection device, an arithmetic unit for calculating an operating amount of an absorption liquid pump by the fuzzy logical calculation on the basis of the information obtained by the detection device and the fuzzy rules and membership functions of the memory device, and a control device for an absorption liquid pump for inputting an output of the arithetic unit to increase or decrease the frequency of electric power supplied to the absorption liquid pump. Therefore, when the liquid surface of the high temperature generator is changed, the fuzzy logical calculation is carried out by the arithetic unit, the frequency of electric power supplied to the absorption liquid pump is increased or decreased by the control device of the absorption liquid pump, and the circulation amount of the absorption liquid is controlled on the basis of human experiences, thus enhancing the responsiveness to the aforesaid changes, as a consequence of which the liquid surface of the absorption liquid of the high temperature generator can be maintained substantially constant. As the result, it is possible to enhance the heating efficiency in the high temperature generator, to avoid the mixture of the absorption liquid into the refrigerant liquid and to stabilize the operation of the absorption refrigeration machine.

Furthermore, there are provided a memory device for storing a liquid surface of absorption liquid of a high temperature generator, a heating amount of the high temperature generator, and fuzzy rules and membership functions between a temperature of the high temperature generator and an operating amount of an absorption liquid pump, an arithmetic device for calculating the operating amount of the absorption liquid pump by the fuzzy logical calculation on the basis of the liquid surface of the absorption liquid of the high temperature generator, the heating amount of the high temperature generator or the temperature of the high temperature generator and the fuzzy rules and membership functions, and a control device for an absorption liquid pump for controlling the frequency of electric power supplied to the absorption liquid pump by inputting an output of the arithmetic unit. Therefore, when the liquid surface of the absorption liquid of the high temperature generator, the heating amount of the high temperature generator or the temperature of the high temperature generator is changed, the frequency of the electric power supplied to the absorption liquid pump based on human experience is controlled by the fuzzy logical calculation to change the circulation amount of the absorption liquid, as a consequence of which the liquid surface of the absorption liquid can be maintained substantially constant irrespective of the magnitude of changes of the liquid surface of the absorption liquid of the high temperature generator, the heating amount of the high temperature generator, or the temperature of the high temperature generator, and the operation of the absorption refrigeration machine can be stabilized.

In addition, the fuzzy logical calculation is carried out on the basis of the rate of change of the liquid surface of the absorption liquid of the high temperature generator, the deviation of the liquid surface, the rate of change of the heating amount of the high temperature generator, the rate of change of the temperature of the high temperature generator, the rate of change of the inlet temperature of cooling water, the fuzzy rules and membership functions to control the frequency of electric power supplied to the absorption liquid pump, whereby when the liquid surface of the high temperature generator is changed, circulation amount of the absorption liquid based on the human experiences can be changed. As the result, it is possible to maintain the liquid surface of the high temperature generator substantially constant and to stabilize the operation of the absorption refrigeration machine irrespective of the magnitude of the rate of change of the liquid surface of the high temperature generator, the deviation of the liquid surface, the rate of change of the heating amount, the rate of change of the temperature and the rate of change of the inlet temperature of cooling water.

What is claimed is:

1. A control device for an absorption refrigeration machine in which an evaporator, an absorber, an absorption liquid pump, a generator and a condenser, etc. are connected to form a refrigeration cycle, and a heating amount of the generator is controlled on the basis of external conditions or internal conditions, said device comprising:
a memory device for storing an absorption liquid surface of the generator, a fuzzy rule between an heating amount of the generator and a circulation amount of absorption liquid, and a membership function between the absorption liquid surface of the generator, the heating amount of the generator and the circulation amount of the absorption liquid;
an arithmetic unit for carrying out fuzzy logical calculation on the basis of the absorption liquid surface of the generator, the heating amount of the generator, the fuzzy rule and the membership function to calculate an operating amount of the absorption liquid pump; and
a control device for the absorption liquid pump for inputting an output of the arithmetic unit to increase or decrease the frequency of electric power supplied to the absorption liquid pump.

2. A control device for an absorption refrigeration machine in which an evaporator, an absorber, an absorption liquid pump, a generator and a condenser, etc. are connected to form a refrigeration cycle, and a heating amount of the generator is controlled on the basis of external conditions or internal conditions, said device comprising:
a memory device for storing a liquid surface of absorption liquid of the generator, a heating amount of the generator, a fuzzy rule between a temperature of the generator and a circulation amount of absorption liquid and a membership function between the heating amount of the generator, the temperature of the generator and the circulation amount of absorption liquid;
an arithmetic unit for carrying out fuzzy logical calculation on the basis of the liquid surface of absorption liquid of the generator, the heating amount of the generator, the temperature of the generator, the fuzzy rule and the membership function; and
a control device for the absorption liquid pump for inputting an output of said arithmetic unit to increase or decrease the frequency of electric power supplied to the absorption liquid pump.

3. A control device for an absorption refrigeration machine in which an evaporator, an absorber, an absorption liquid pump, a generator and a condenser, etc. are connected to form a refrigeration cycle, and a heating amount of the generator is controlled on the basis of external conditions or internal conditions, said device comprising:
a memory device for storing a deviation from a set value of an absorption liquid surface of the generator, a rate of change of the absorption liquid surface, a rate of change of the heating amount of the generator, a rate of change of the temperature of the generator, and fuzzy rules and membership functions between a rate of change of inlet temperature of cooling water and a circulation amount of absorption liquid;
an arithmetic unit for carrying out fuzzy logical calculation on the basis of a deviation from a set value of an absorption liquid surface of the generator, a rate of change of the absorption liquid surface, a rate of change of the heating amount of the generator, a rate of change of the temperature of the generator, a rate of change of inlet temperature of cooling water, fuzzy rules and membership functions to calculate an operating amount of the absorption liquid pump; and
a control device for an absorption liquid pump for inputting an output of said arithmetic device to increase or decrease the frequency of electric power supplied to the absorption liquid pump.

4. A control device for an absorption refrigeration machine in which an evaporator, an absorber, an absorption liquid pump, a generator and a condenser, etc. are connected to form a refrigeration cycle, and a heating amount of the generator is controlled on the basis of external conditions or internal conditions, said device comprising:
- a memory device for storing a fuzzy rule between a deviation from a set value of an absorption liquid surface of the generator and an operating amount of the absorption liquid pump and a membership function between the deviation from the set value of the absorption liquid surface of the generator and the operating amount of the absorption liquid pump;
- an arithmetic unit for carrying out fuzzy logical calculation on the basis of the deviation from the set value of the absorption liquid surface of the generator, the fuzzy rule and the membership function to calculate an operating amount of the absorption liquid pump; and
- a control device for the absorption liquid pump for inputting an output of said arithmetic unit to increase or decrease the frequency of electric power supplied to the absorption liquid pump.

5. A control device for an absorption refrigeration machine in which an evaporator, an absorber, an absorption liquid pump, a generator and a condenser, etc. are connected to form a refrigeration cycle, and a heating amount of the generator is controlled on the basis of external conditions or internal conditions, said device comprising:
- a memory device for storing a fuzzy rule between a deviation from a set value of an absorption liquid surface of the generator and an operating amount of the absorption liquid pump, a fuzzy rule between a rate of change of the absorption liquid surface and an operating amount of the absorption liquid pump, a membership function between the deviation from the set value of the absorption liquid surface of the generator and the operating amount of the absorption liquid pump, and a membership function between a rate of change of the absorption liquid surface and an operating amount of the absorption liquid pump;
- an arithmetic unit for carrying out fuzzy logical calculation on the basis of the deviation from the set value of the absorption liquid surface of the generator, the rate of change of the absorption liquid surface, the fuzzy rules and the membership functions to calculate an operating amount of the absorption liquid pump; and
- a control device for the absorption liquid pump for inputting an output of said arithmetic unit to increase or decrease the frequency of electric power supplied to the absorption liquid pump.

* * * * *